US006922548B1

(12) United States Patent
Moore et al.

(10) Patent No.: US 6,922,548 B1
(45) Date of Patent: *Jul. 26, 2005

(54) PROVIDING REMOTE NETWORK DRIVER INTERFACE SPECIFICATION SERVICES OVER A WIRELESS RADIO-FREQUENCY MEDIUM

(75) Inventors: Timothy M. Moore, Bellevue, WA (US); Ervin Peretz, Redmond, WA (US); Kenneth D. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,565

(22) Filed: Apr. 24, 2000

(51) Int. Cl.[7] .................................................. H04B 7/00
(52) U.S. Cl. ...................... 455/41.2; 455/557; 455/528; 455/463; 709/315; 709/331; 709/332; 710/62; 710/63; 710/8; 710/65
(58) Field of Search ............................ 455/41.2, 422.1, 455/463, 557, 528, 41.1, 517; 709/315, 332, 331; 370/328, 252, 449, 466; 710/62, 63, 8

(56) References Cited

U.S. PATENT DOCUMENTS

| 5,497,412 A | * | 3/1996 | Lannen et al. ............ 455/432.2 |
| 5,566,331 A | * | 10/1996 | Irwin et al. .................... 707/10 |
| 5,765,155 A | * | 6/1998 | Nakamura ..................... 707/10 |
| 5,875,478 A | * | 2/1999 | Blumenau ..................... 711/162 |
| 5,918,158 A | * | 6/1999 | LaPorta et al. ............. 340/7.29 |
| 5,949,776 A | * | 9/1999 | Mahany et al. .............. 370/338 |
| 5,987,060 A | | 11/1999 | Grenon et al. |
| 6,480,505 B1 | * | 11/2002 | Johansson et al. .......... 370/449 |
| 6,480,711 B1 | * | 11/2002 | Guedalia .................. 455/412.1 |
| 6,600,726 B1 | * | 7/2003 | Nevo et al. .................. 370/278 |
| 6,603,744 B2 | * | 8/2003 | Mizutani et al. ............. 370/310 |

FOREIGN PATENT DOCUMENTS

| EP | 0 975 123 A1 | 1/2000 |
| EP | 0 998 094 A2 | 5/2000 |

OTHER PUBLICATIONS

Patent Abstracts of Japan, vol. 2000, No. 03, Mar. 30, 2000 & JP 11 355322 A (Nokia Mobile Phones Ltd), Dec. 24, 1999 abstract.

(Continued)

*Primary Examiner*—Marceau Milord
(74) *Attorney, Agent, or Firm*—Leydig Voit & Mayer LTD

(57) ABSTRACT

The present invention provides a method and computer program product for providing, over a RF link conforming to the Bluetooth specification, a network message protocol which is bus-independent and was originally designed for bus-attached networking devices. One such network message protocol is the NDIS device management protocol. In such a manner, many computer software products designed to operate over a hard-wired (or bus-attached) network can also be used over a Bluetooth wireless network.

18 Claims, 3 Drawing Sheets

OTHER PUBLICATIONS

Post, Guido, et al., *Control and Data Flow Aspects in the Design of A Wireless Data Radio Modem: A Case Study*, 1996 IEEE International Conference on Acoustics, Speech, and Signal Processing—Proceedings, (ICASSP), Atlanta, May 7–10, 1996; IEEE International Conference on Acoustics, Speech, and Signal Processing—Proceedings, (ICASSP), New York, IEEE, US, vol. 6 Conf. 21, May 7, 1996, pp. 3201–3204, XP000681738.

*Specification of the Bluetooth System*, v.1.0B, Dec. 1, 1999.

Riku Mettala et al., *Bluetooth Protocol Architecture* (White Paper), v1.0, Nokia Mobile Phones, Sep. 29, 1999.

Brent Miller et al., *Mapping Salutation Architecture APIs to Bluetooth Service Discovery Layer* (White Paper), v. 1.0, IBM Corporation, Jul. 1, 1999.

IEEE Standard, 802.11, *Part 11: Wireless LAN Medium Access Control (MAC) and Physical Layer (PHY) Specifications*, $1^{st}$ Ed. 1999, and Supplements 802.11a–1999 and 802.11b–1999.

Bob O'Hara and AI Petrick, *IEEE 802.11 Handbook A Designer's Companion*, Dec. 1999.

Pat Megowan et al., *IrDA Object Exchange Protocol*, v1.2, Counterpoint Systems Foundry, Inc. Microsoft Corporation, Mar. 18, 1999.

*Universal Plug and Play Device Architecture*, v1.0, Microsoft Corporation, Jun. 8, 2000.

Golden G. Richard III, "Service Advertisement and Discovery: Enabling Universal Device Cooperation," http://computer.org/internet/, Sep.–Oct. 2000.

ETSI TS 101 369 v7.1.0 (Nov. 1999), *Digital Cellular Telecommunications System (Phase 2+); Terminal Equipment to Mobile Station (TE–MS) Multiplexer Protocol*, Global System for Mobile Communications (GSM 07.10 v7.1.0 Release 1998).

\* cited by examiner

PROVIDING REMOTE NETWORK DRIVER INTERFACE SPECIFICATION SERVICES OVER A WIRELESS RADIO-FREQUENCY MEDIUM

CROSS-REFERENCE TO RELATED APPLICATION

This application is related to U.S. application Ser. No. 09/556,567, entitled "Bluetooth Compliant Wireless Device Connections As Modems Or Sockets" filed on Apr. 24, 2000 and U.S. application Ser. No. 09/556,568, entitled "Bluetooth MiniPort Driver Model" filed on Apr. 24, 2000 both of which are incorporated herein by reference in their entirety.

TECHNICAL FIELD

This invention relates generally to wireless interface technology and, more particularly, relates to the interface between computer software applications and wireless devices operating in accordance with the Bluetooth specification.

BACKGROUND OF THE INVENTION

To provide the greatest compatibility between software and hardware components on a computer system, the operating system of the computer defines certain interfaces which can be accessed and used by the programmers of the software components and which are to be provided and supported by the designers of hardware components. Thus, by using the defined interface, the software component can be assured of compatibility with all of the hardware components which support the interface. Similarly, a hardware component providing a specific interface can be assured that software components will be able to locate and access the functionality provided by the hardware component through the interface.

Generally, computers and other electronic devices are interconnected via physical cables or wires. These communication paths allow for the exchange of data or control information between such devices. However, it increasingly recognized that certain advantages arise from the elimination of cables and wires to interconnect devices. Such advantages include ease of configuration and reconfiguration, due to the elimination of the need to physically add, remove, or displace a physical medium. Furthermore, space which would traditionally be used for device interconnection media may be given to other uses. Furthermore, device mobility is increased through the use of wireless connections.

One method for providing wireless connections between devices employs a light wave in the Infrared region of the electromagnetic spectrum to link devices. The IrDA (Infrared Data Association) protocol defines one such connection mechanism. Unfortunately, such a mechanism must usually operate in a line of sight manner. That is to say that any opaque obstruction between transmitter and receiver will prevent proper operation. Additionally, IR transmitters are typically not omnidirectional when incorporated into a communicating device, so that for proper operation, the transmitter must be pointed generally in the direction of the receiver, within some nominal deviation such as 30 degrees. Finally, IR transmitters are typically fairly low power devices, and accordingly the range of IR links is usually limited to approximately one meter.

Radio frequency links solve many of the problems inherent in Infrared links, however, a radio frequency connection scheme is needed whereby a variety of applications can easily access the radio link through a connection mechanism that provides an appropriate interface. One protocol which defines communication between wireless devices through radio frequency links is the Bluetooth specification. Bluetooth devices do not require a line of sight with one another to operate, and their range can be significantly greater than that of IR links. However, one difficulty with the Bluetooth specification is that very few computer software programs are written to communicate with Bluetooth compliant devices. Another difficulty with the Bluetooth specification is that there are very few higher level networking protocols which are designed to operate over an RF link conforming to the Bluetooth specification.

SUMMARY OF THE INVENTION

Accordingly, the present invention provides a method and computer program product for providing, over a RF link conforming to the Bluetooth specification, a network message protocol which is bus-independent and was originally designed for bus-attached networking devices. In such a manner, many computer software products designed to operate over a hard-wired (or bus-attached) network can also be used over a Bluetooth wireless network.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
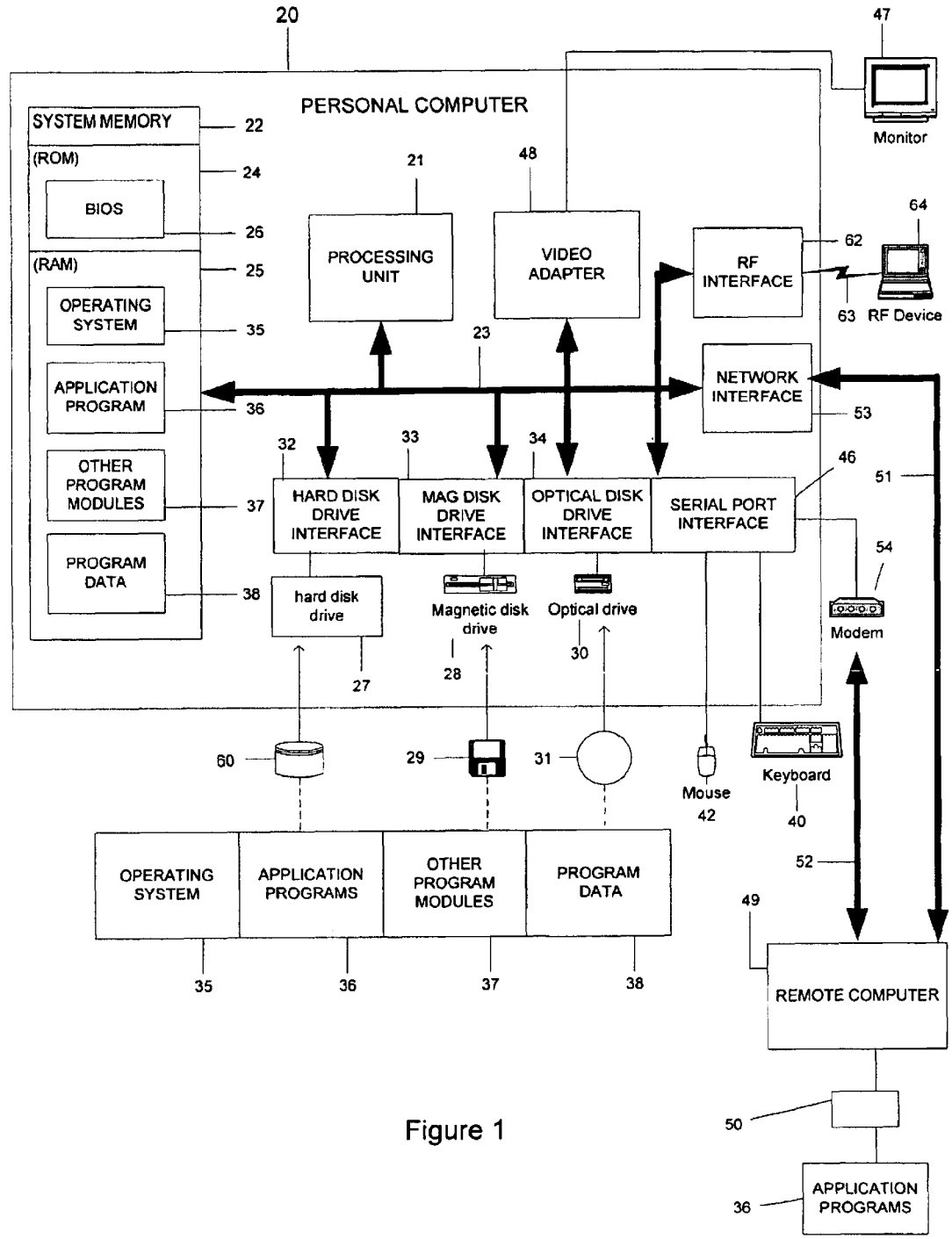
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers or devices, such as a remote computer 49 or RF device 64. The remote computer 49 may be another personal computer, a server, a router, a network PC, a peer device or other common network node, and typically includes many or all of the elements described above relative to the personal computer 20, although only a memory storage device 50 has been illustrated in FIG. 1. The Radio Frequency (RF) device 64 can be a cellular phone, digital camera, another personal computer, or other device which includes the capability to communicate through the RF spectrum. The logical connections depicted in FIG. 1 include a local area network (LAN) 51 and a wide area network (WAN) 52, and an RF connection 63. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46: When used in conjunction with an RF connection 63, the personal computer 20 includes an RF interface 62. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
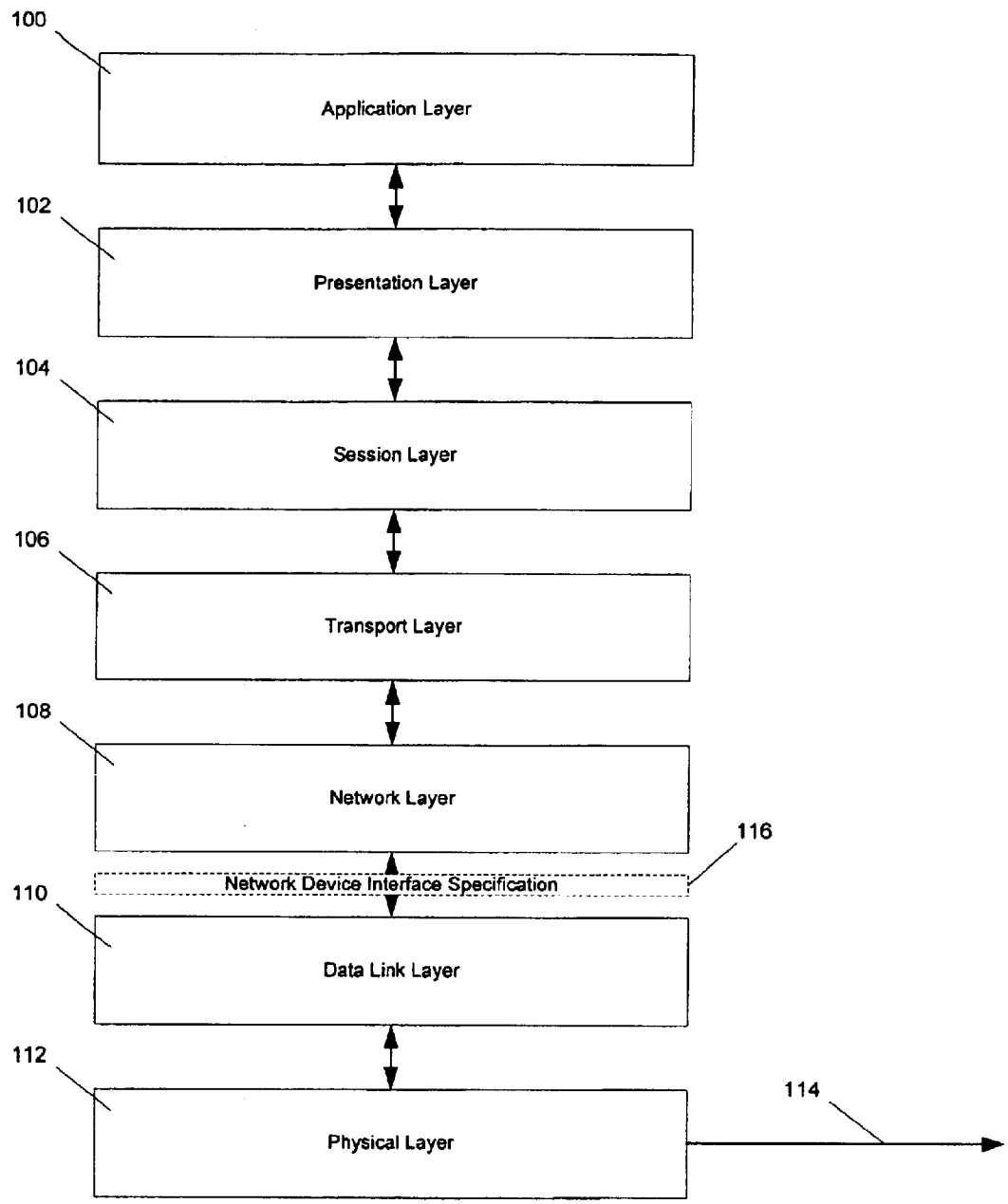
FIG. 2 is a block diagram generally illustrating a seven layer network model.

In accordance with the invention, and turning to FIG. 2, the Open Systems Interconnection (OSI) seven-layer model is shown. This model is an industry standard abstraction of computer networking. The application layer 100 directly serves the end user and supports the software applications with which the user interacts. The presentation layer 102 provides the mechanisms which interpret data being sent from the application layer 100 on one computer to the application layer on another. The session layer 104 describes the organization of the data being transferred. The transport layer 106 acts as a final error correcting layer to ensure the data is delivered accurately, in the proper sequence, and with no loss or duplication. The network layer 108 defines the addressing and routing of the data across the network. It controls the operation of the local sub-network and decides which physical path the data should take, given network conditions, priority of service, and other factors. The data link layer 110 controls the transmission of blocks of data, or packets, across the network, and provides more fundamental error correction. The data link layer 10 is divided into two sublayers: the logical link control (LLC) sublayer and the media access control (MAC) sublayer. The LLC sublayer ensures error-free transmission of data frames by maintaining logical links, controlling frame flow, sequencing frames, acknowledging frames; and retransmitting unacknowledged frames. The MAC sublayer manages access to the network, checks frame errors and address recognition of the received frames. Protocols which include an LLC sublayer need only a minimal transport layer 106. Finally, the physical layer 112 carries the signals which are sent to the network connection 114. Generally, the physical layer 112 is implemented in the hardware connecting the computer 20 to the network connection 114.

A Network Device Interface Specification (NDIS) 116 can reside between the network layer 108 and the data link layer 110. The NDIS 116 can provide a library of interfaces between the software components and the hardware components. The NDIS 116 can define a fully abstracted environment for network interface card (NIC) driver development by providing routines for every external function that a NIC driver would need to perform. Thus, the NDIS 116 can provide interfaces for communication between a NIC driver and a overlying protocol driver and between a NIC driver and the underlying NIC hardware itself.

Generally the application layer 100, presentation layer 102, session layer 104, transport layer 106, and the network layer 108 are implemented in software components operating on a computer. The data link layer 110 and the physical layer 112 are generally implemented by the hardware components, such as a network interface card. The NDIS 116 library can be used by a software driver implemented in the transport layer 110 to communicate with a network interface card driver implemented at the data link layer 110. A transport layer driver generally implements a network protocol stack, such as the well known Transfer Control Protocol/Internet Protocol (TCP/IP) stack used on the Internet. If the transport layer software driver has a packet of data to be transmitted, it can call the NIC driver by means of an interface from the NDIS 116 library, and pass down the packet to be transmitted. Similarly, the NIC driver can use an interface of the NDIS 116 to pass the packet to the NIC itself for transmission across the network. The NDIS 116 interface can call the operating system specific components which perform the transmission at the NIC. The NDIS 116 interfaces can also be used by the NIC driver to communicate with the transport layer software driver and pass up a received packet of data, or other information.

One example of the physical layer 112 is the wireless Radio-Frequency (RF) device 64. An increasingly popular RF protocol for wireless communication between device 64 and computer 20 is the Bluetooth protocol, described in more detail in the "Specification of the Bluetooth System" Version 1.0B (Dec. 1, 1999) incorporated herein by reference in its entirety. See also the "Windows Wireless Architecture" presentation at Appendix B, the "Bluetooth Architecture Overview" presentation at Appendix C, the "Bluetooth Experience in Windows" presentation at Appendix D, and the "Bluetooth Stack in Windows" presentation at Appendix E. As described in the Bluetooth Specification, the Logical Link Control and Adaptation Protocol (L2CAP) allows higher level protocols to operate over a Bluetooth compliant RF link. The L2CAP layer is more particularly described in "Specification of the Bluetooth System" Version 1.0B, Part D entitled "Logical Link Control and Adaptation Protocol Specification" (Dec. 1, 1999), attached at Appendix A, and incorporated herein by reference in its entirety. One such higher level messaging protocol is the Remote Network Device Interface Specification (Remote NDIS) from Microsoft Corporation, described in more detail in co-pending application Ser. No. 09/302,735, entitled "Method and System for Abstracting Network Device Drivers" by Hyder et al., filed on Apr. 30, 1999, and assigned to the assignee of the present application, which is incorporated herein by reference in its entirety. As described in the co-pending application, Remote NDIS provides extensibility without change to the bus specific message transport mechanisms, allowing implementation on a greater variety of such transport mechanisms implemented by the physical layer 112. Remote NDIS also provides a driver architecture which is proved for both networking and external bus device models.

"In the absence of the present invention, hardware manufactures are required to write two drivers, an NDIS miniport driver and a bus or network interface. However, the two drivers may be distributed as a single binary. The first driver, the NDIS miniport driver, exchanges information with NDIS 116 and communicates with the bus or network interface driver through some vendor-specific API. The bus or network interface driver is bus- or network-specific and communicates with hardware through the appropriate bus or network driver. The NDIS miniport driver and the bus or network interface driver communicate through a vendor-specific API because both drivers are written by the manufacturer of the network device being accessed. Therefore, while the NDIS miniport must conform to the NDIS API in order to communicate with NDIS layer 116, and the bus or network interface must conform to the appropriate bus or network driver in passing information to network device, the interaction between the NDIS miniport and the bus or network interface is completely at the discretion of the hardware manufacturer.

Requiring device manufacturers to write two drivers for each piece of equipment they market presents some fairly serious problems. For example, the sheer number of device drivers is difficult and expensive to manage, both for the hardware manufacturer and for operating system developers who may distribute certain device drivers with their software. Furthermore, since manufacturers provide both the connection to NDIS and the bus or network interface, the network functionality and the specifics of a particular bus are likely to be coupled, making it impossible to update one without the other. Solving these problems will allow for faster deployment of remotely connected networking devices and lower costs for developing host-based drivers.

The NDIS miniport driver and the bus or network interface, both of which were provided by the device hardware manufacturer, can be replaced with a Remote NDIS miniport layer and bus- or network-specific microports. The Remote NDIS miniport layer and bus- or network-specific microports are independent of the particular device being accessed and therefore can be included as part of the operating system. Therefore, hardware manufacturers writing to the Remote NDIS specification are no longer required to write host-based drivers for their devices. Remote NDIS defines a connection-agnostic or connection-independent message set along with a description of how the message set operates over a particular connection, such as a specific bus or network. Because the remote NDIS interface is standardized, a core set of host drivers can support any number of attached networking devices, thereby improving system stability and user satisfaction because no new drivers must be installed to support a new network device. The remote NDIS architecture includes a remote NDIS miniport driver that understands the remote NDIS message set and communicates with bus- or network-specific microport drivers. Specifically, the Remote NDIS miniport layer encapsulates NDIS OIDs (Object IDentifiers) and NDIS data packets into data structures that can be passed without modification to a networking device. The data structures are known as Remote NDIS messages.

The bus- or network-specific microport drivers represent an intermediate layer that understands the bus or network responsible for passing the messages onto the device. Thus, the microport layer receives the remote NDIS messages and passes them to the corresponding element of a bus or network driver layer. The bus or network driver layer then passes the remote NDIS message to remote the NDIS devices.

Because network protocol mechanisms are abstracted above the bus or network-specific microport layer, adding new network functionality can be accomplished by changing only the remote NDIS miniport layer. The microport layer remains unchanged because it is merely a message transport mechanism that passes NDIS OIDs and NDIS data packets encapsulated in remote NDIS messages. Furthermore, adding network functionality in the form of new NDIS OIDs is available to all bus or network microports because a single remote NDIS miniport layer can serve them all. The present invention also maintains backward compatibility. As new NDIS OIDs are added, a remote NDIS device may respond that it does not understand the NDIS OID and therefore does not support the new network functionality."

Figure 3:
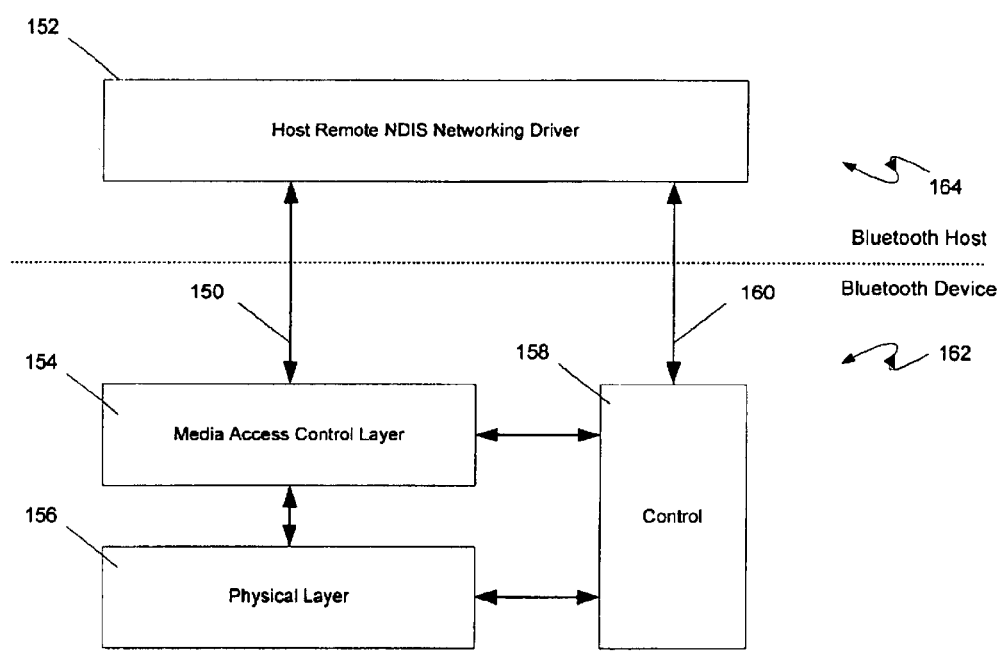
FIG. 3 is a block diagram generally illustrating a layer model on which the present invention can operate.

Turning now to FIG. 3, a single L2CAP channel, such as L2CAP channel 160, can be used for Remote NDIS control communications. Such control communications can include control messages, the responses to those messages, and messages by which the device 162 can indicate a change in state. A separate L2CAP channel 150 can be used to exchange Remote NDIS data packets. A data message can be up to 1500 bytes in length, which takes approximately 20 ms when using the full Bluetooth bandwidth, and can greatly increase should the data message be required to share the bandwidth with other traffic. Therefore, a separate L2CAP channel 160 is provided to limit the latency in sending control messages. Additional L2CAP channels can be added to accommodate multiple networking channels that may exist on the device 162.

As was described above with reference to FIG. 2, control messages are sent directly to the control layer 158, shown in FIG. 3, while the data can be first received by the Media Access Control Layer 154 and then encapsulated for transmission across the physical network at the physical layer 156. To facilitate the sending of responses and status signals, and to allow for immediate control, the control layer 158 is connected directly to both the Media Access Control Layer 154 and the physical layer 156.

Network data is passed between the host 164 and the device 162 over the L2CAP channel 150. This data can be encapsulated in an NDIS packet mechanism, on the model already used by the NDIS network stack. The maximum length of packets supported by L2CAP can be the maximum MTU of the media minus the RNIDS header size. The device 152 can fill in the MaxTransferSize value in an NDIS function call to the largest L2CAP message it can send. If the host 164 has a smaller L2CAP maximum message size, it can overwrite the returned information with its own maximum message size. Either the host 164 or the device 162 can initiate the setup of both the control and data L2CAP channels.

A minimal Service Discovery Protocol (SDP) record which can be used for a Bluetooth Remote NDIS device can be as shown in Table 1 below. As can be seen, the Remote NDIS device uses the standard Service Discovery description. Personal Area Network (PAN) services can communicate with each other. It is possible for a Bluetooth device to have multiple PAN services. For example, a cellular phone can have a Wireless WAN server that gives Bluetooth devices access to the cellular data network. In such a case the ServiceName can be "WWAN", or an even more descriptive name. Alternatively, the cellular phone can have a PAN service that allows internal PAN service to communicate peer-to-peer between devices. In such a case, the Service-Name can be set to "PEER". A device should not advertise more than one PAN profile with a ServiceName of PEER.

TABLE 1

| Item | Definition | Type/Size | Value | Attribute ID |
|---|---|---|---|---|
| ServiceClassIDList | | | | 0x0001 |
| ServiceClass0 | | UUID/32-bit | | |
| ProtocolDescriptorList | | | | 0x0004 |
| Protocol0 | L2CAP | UUID/32-bit | L2CAP | |
| Protocol1 | PAN | UUID/32-bit | PAN | |
| ProtocolSpecificParameter0 | Control Channel | Unit8 | N = control channel # | |
| ProtocolSpecificParameter1 | Data Channel | Unit8 | N = data channel 1 | |
| ProtocolSpecificParameterN | Data Channel | Unit8 | N = control channel N | |
| ServiceName | Displayable text name | | | |

A remote NDIS Bluetooth device can initiate or accept two or more L2CAP channels: a control channel and one or more data channels. Messages to the device 162 can be sent in the form of L2CAP Packet Data Unit (PDU). The device can be sent a message on the control channel 160 from the host 164, and can then send the response on that same control channel. One example of such a typical transaction for a Bluetooth RNDIS device can be as follows. The host 164 issues a Bluetooth WRITE on the control channel, with the contents consisting of an NdisQueryRequest type. The RNDIS_OID value of the NdisQueryRequest can be set to OID_GEN_MEDIA_CONNECT_STATUS. Once the device 162 receives the Bluetooth data, it decodes the NdisQueryRequst, and does the necessary actions to determine the connection status. When the device has the information requested by the host in the NdisQueryRequest, it issues a Bluetooth WRITE on the control channel 160, consisting of an NdisQueryResponse. In this case, the NdisQueryResponse can be set to OID_GEN_MEDIA_CONNECTION_STATUS.

Bluetooth is a peer-to-peer system. Furthermore, the SDP record does not define a difference between the host and device system. It is therefore possible that the Bluetooth microport is capable of working against itself. A host-only RNDIS microport only needs to initiate certain messages and will only receive certain messages. However, because a microport can be a host, a device, or both, it can process all messages that can be received by either a host or a device. It is, therefore, necessary for the microport to deal with these messages. A Bluetooth microport can act as only a host microport when connected to a cellular phone, for example, and as a dual host/device when connected to another machine that is also running the microport. The microport must be designed in such a way that oscillations in processing messages do not occur.

Remote NDIS defines the format for the REMOTE_NDIS_PACKET message including space to transport NDIS OOB and per packet information fields. The per packet information files can be supplied by NDIS when the remote driver specifies it supports the functionality. The OOB information can be supported for particular media types. For example, for Ethernet peer-to-peer emulation fields are not required. In such a case, 44 bytes of offsets and lengths of packet information fields are not required. Thus, for a 1514 byte Ethernet MTU L2CAP can have a minimum of 1554 byte MTU and wastes approximately 3% of the Bluetooth bandwidth. This could be an issue for slow links. This can be optimized if DataOffset is 4, assuming the rest of the RNDIS_PACKET header is NULL. This can reduce the data overhead to 16 bytes or 1%.

In operation, the Bluetooth microport can be loaded when a remote Bluetooth device, which supports the PAN service, is in range and can be communicated to. Loading the microport can cause an initialization message to be sent from the microport. When the remote device is a cellular phone, for example, it can respond with an initialization complete message. When the remote device is another Windows machine, as another example, it can also generate an initialization message. The microport can also receive extra messages such as REMOTE_NDIS_INITIALIZE_MSG, REMOTE_NDIS_QUERY_MSG, REMOTE_NDIS_SET_MSG, REMOTE_NDIS_RESET_MSG, and REMOTE_NDIS_KEEPALIVE_MSG. These messages are described in more detail in the article entitled "Remote NDIS Over Bluetooth Specification", dated Mar. 20, 2000, and attached at Appendix F.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of using a network device, the network device comprising a network connection and a wireless connection, the method comprising the steps of:
   abstracting device control commands and data into a device-independent format;
   using a connection-independent driver layer to encapsulate the abstracted device control commands and data into a connection-independent format;
   using an intermediate driver layer to translate the encapsulated device control commands and data into connection-specific device control commands and data; and
   using a connection-specific driver layer to wirelessly transmit the connection-specific device control commands and data to the network device, wherein the network device receives the connection-specific device control commands and data through the wireless connection, and transmits the data through the network connection.

2. The method of claim 1, wherein the wireless connection is a Bluetooth connection; and the connection-specific device control commands and data conform to the Bluetooth protocol.

3. The method of claim 1, wherein the connection-specific driver layer transmits the connection-specific device control commands and data to the network device via at least one L2CAP channel.

4. The method of claim 3, wherein the transmitting of the connection-specific device control commands and data via the at least one L2CAP channel comprises transmitting the connection-specific device control commands via a first L2CAP channel and transmitting the connection-specific data via a second L2CAP channel.

5. The method of claim 1, wherein the intermediate driver layer translates the encapsulated device control commands and data into connection-specific device control commands and data with reference to a service discovery protocol record.

6. The met hod of claim 1, wherein the connection-specific driver layer transmits the connection-specific device control commands and data by segmenting the connection-specific device control commands and data into packets smaller than a maximum transmission unit of a wireless protocol used by the wireless connection of the network device.

7. A computing device connected to a network through a wireless device, the computing device comprising:
   a device independent driver layer for abstracting device control commands and data into a device-independent format;
   a connection-independent driver layer for encapsulating the abstracted device control commands and data into a connection-independent format;
   an intermediate driver layer for translating the encapsulated device control commands and data into connection-specific device control commands and data;
   a connection-specific driver layer for transmitting the connection-specific device control commands and data to the wireless device; and
   wireless communication hardware for use by the connection-specific driver layer to transmit the connection-specific device control commands and data to the wireless device.

8. The computing device of claim 7, wherein the wireless communication hardware uses the Bluetooth protocol; and the connection-specific device control commands and data conform to the Bluetooth protocol.

9. The computing device of claim 7, wherein the connection-specific driver layer transmits the connection-specific device control commands and data to the wireless device via at least one L2CAP channel.

10. The computing device of claim 9, wherein the connection-specific driver layer transmits the connection-specific device control commands via a first L2CAP channel and the connection-specific data via a second L2CAP channel.

11. The computing device of claim 7 wherein the intermediate driver layer references a service discovery protocol record while translating the encapsulated device control commands and data into the connection-specific device control commands and data.

12. The computing device of claim 7, wherein the connection-specific driver layer segments the connection-specific device control commands and data into packets smaller than a maximum transmission unit of a wireless protocol used by the wireless communication hardware.

13. A computer program product for using a network device comprising a network connection and a wireless connection, the computer program product comprising a computer-readable medium having computer-executable instructions for performing steps comprising:

abstracting device control commands and data into a device-independent format;

encapsulating the device control commands and data into a connection-independent format;

translating the encapsulated device control commands and data into connection-specific device control commands and data; and transmitting the connection-specific device control commands and data wirelessly to the wireless connection of the network device, wherein the data is transmitted, by the network device, through the network connection.

14. The computer program product of claim 13, wherein the wireless connection is a Bluetooth connection; and the connection-specific device control commands and data conform to the Bluetooth protocol.

15. The computer program product of claim 13, wherein the transmitting of the connection-specific device control commands and data to the network device occurs via at least one L2CAP channel.

16. The computer program product of claim 15, wherein the transmitting of the connection-specific device control commands and data via the at least one L2CAP channel comprises transmitting the connection-specific device control commands via a first L2CAP channel and transmitting the connection-specific data via a second L2CAP channel.

17. The computer program product of claim 13, wherein the translating the encapsulated device control commands and data into the connection-specific device control commands and data comprises referencing a service discovery protocol record.

18. The computer program product of claim 13, wherein the transmitting the connection-specific device control commands and data comprises segmenting the connection-specific device control commands and data into packets smaller than a maximum transmission unit of a wireless protocol used by the wireless device.

* * * * *